United States Patent [19]
Thomas et al.

[11] Patent Number: 5,225,226
[45] Date of Patent: * Jul. 6, 1993

[54] CHEMICAL LEAVENING SYSTEM

[75] Inventors: Mary E. C. Thomas, Freehold; M. Stephen Lajoie, Basking Ridge, both of N.J.

[73] Assignee: Church & Dwight Co., Inc., Princeton, N.J.

[*] Notice: The portion of the term of this patent subsequent to Oct. 6, 2009 has been disclaimed.

[21] Appl. No.: 953,976

[22] Filed: Sep. 30, 1992

Related U.S. Application Data

[63] Continuation-in-part of Ser. No. 738,894, Aug. 1, 1991, Pat. No. 5,153,018.

[51] Int. Cl.$^5$ .............................. A23L 2/40; A21D 2/00
[52] U.S. Cl. ................................. 426/561; 426/551; 426/562
[58] Field of Search ..................... 426/551, 561, 562

[56] References Cited

U.S. PATENT DOCUMENTS

| | | | |
|---|---|---|---|
| 2,372,402 | 3/1945 | Stokes et al. | 426/562 |
| 2,933,396 | 4/1960 | Miller | 426/562 |
| 3,554,762 | 1/1971 | Craig et al. | 426/551 |
| 3,930,032 | 12/1975 | Harris et al. | 426/562 |
| 3,959,499 | 5/1976 | Harris et al. | 426/562 |
| 4,741,917 | 5/1988 | Lauck et al. | 426/551 |
| 4,804,553 | 2/1989 | Tieckelmann | 426/551 |
| 4,857,353 | 8/1989 | Jackson et al. | 426/243 |
| 4,966,782 | 10/1990 | Heidolph et al. | 426/562 |

*Primary Examiner*—Jeanette Hunter
*Assistant Examiner*—Mary S. Mims
*Attorney, Agent, or Firm*—Charles B. Barris

[57] ABSTRACT

The present invention provides an improved leavening system which comprises at least one leavening acid and at least one novel chemical leavening base. The new chemical leavening bases comprise a baking bicarbonate, preferably an alkali metal bicarbonate, ammonium bicarbonate, or a mixture thereof, which has been intimately admixed with a food grade, essentially water insoluble salt or oxide, such that the baking carbonate acts as a carrier for the insoluble salt or oxide which is essentially uniformly distributed throughout and in the surface of the bicarbonate. The leavening system can be used in any type of baked goods which is leavened by a leavening system which includes a gas generating base such as a baking carbonate and a neutralizing acid.

25 Claims, 2 Drawing Sheets

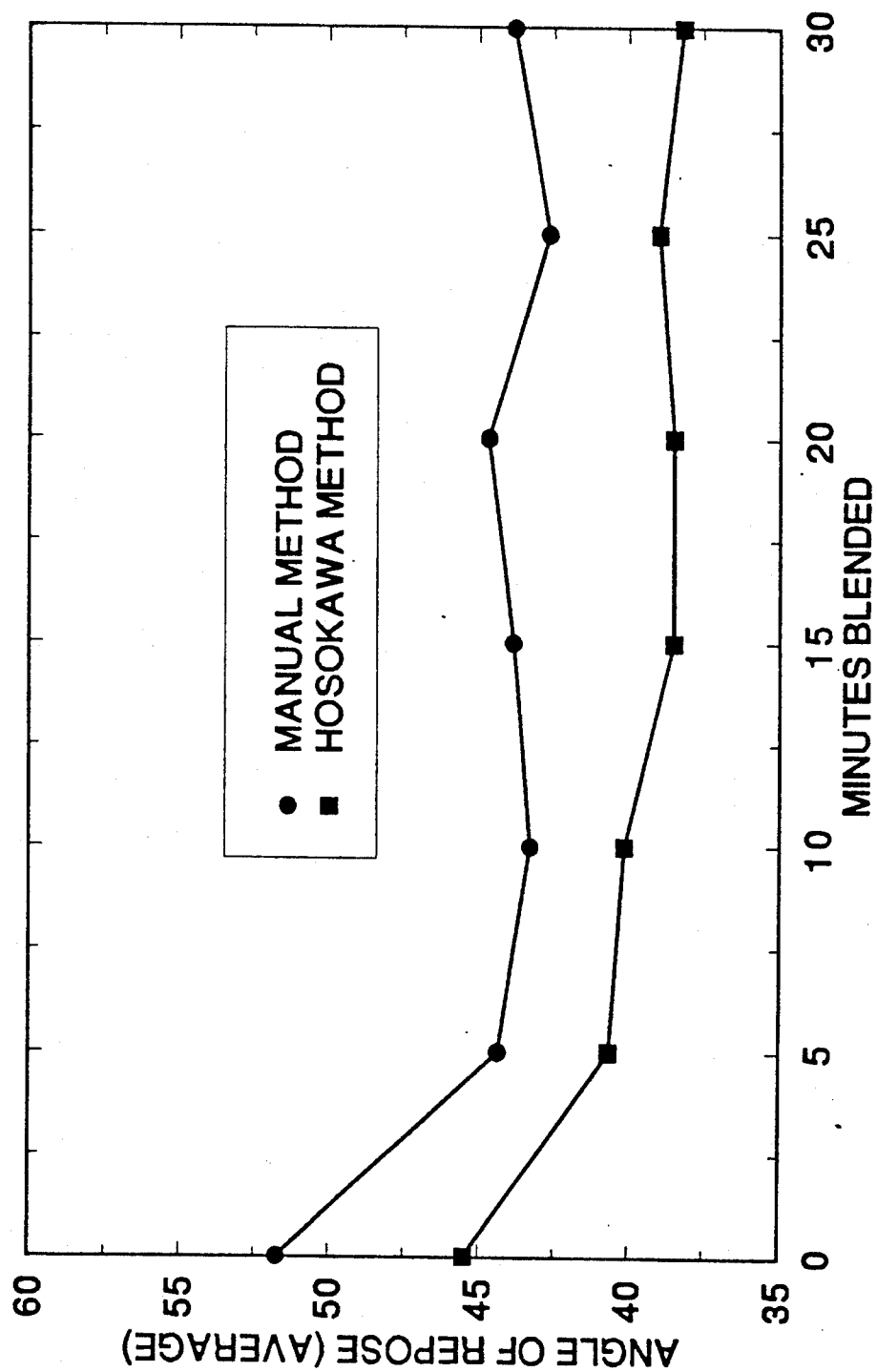

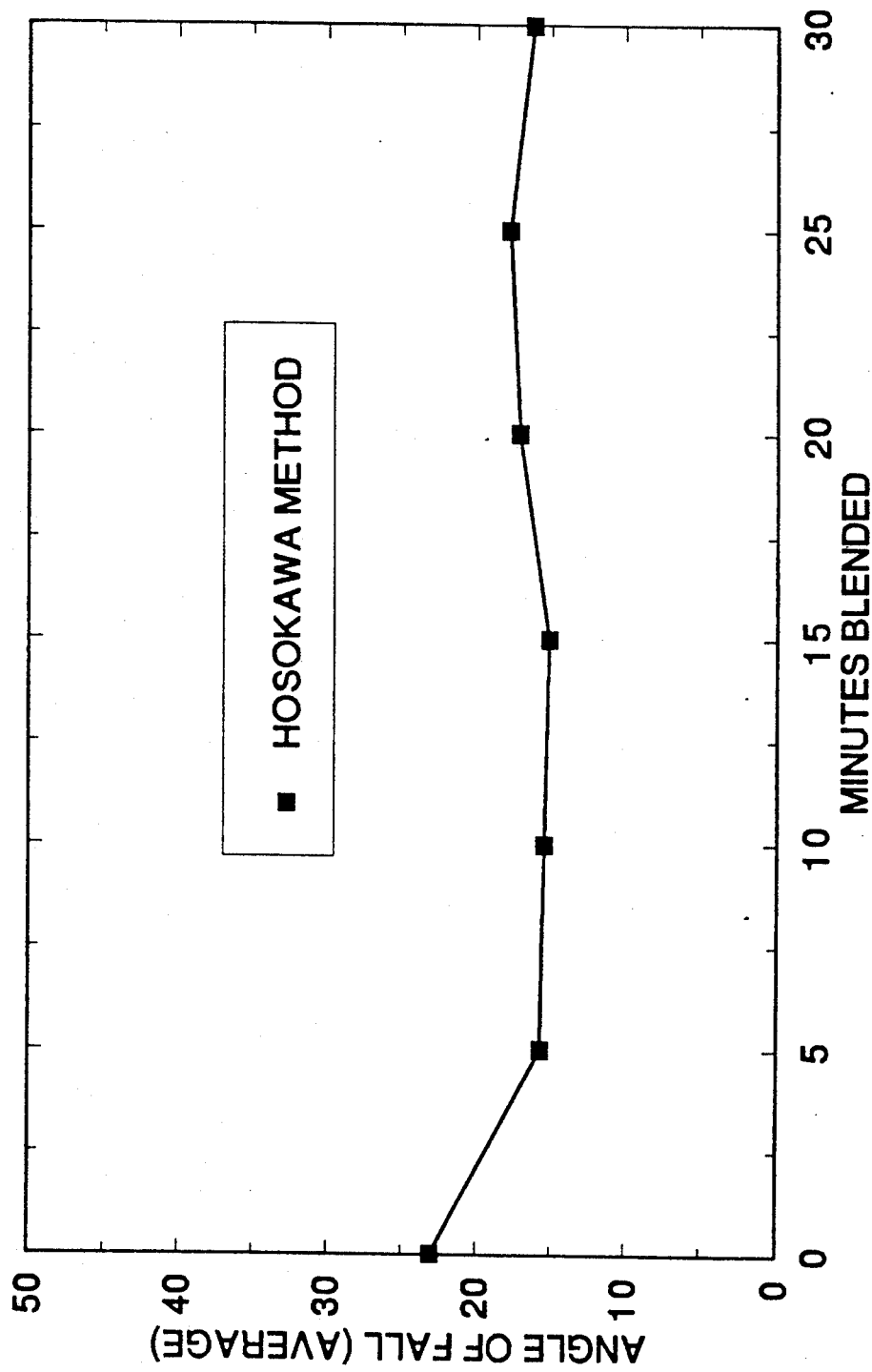

CHEMICAL LEAVENING SYSTEM

CROSS-REFERENCE TO RELATED APPLICATION

This patent application is a continuation-in-part of U.S. patent application Ser. No. 07/738,894, filed Aug. 1, 1991 now U.S. Pat. No. 5,153,018.

TECHNICAL FIELD

This invention relates to novel leavening systems for baking compositions; to novel chemical leavening bases for baking compositions, and to methods for their preparation. More specifically, the invention relates to leavening compositions and chemical leavening bases containing a baking bicarbonate, for example an alkali metal bicarbonate, and also to methods for enhancing baking compositions containing such leavening systems.

BACKGROUND OF THE INVENTION

As is well known to those skilled in the art, the leavening of bakery products is accomplished by liberation of carbon dioxide within the dough or batter during its preparation and in the early stages of baking. The carbon dioxide serves the purpose of lightening the baked product, giving it a finer, smoother texture and increasing its volume.

The rate of gas evolution and the uniformity thereof is an important consideration, determining largely the density and textural qualities which will be imparted to the final baked product. This rate and uniformity must be controlled within rather narrow limits in order to achieve the desired results. Moreover, leavening requirements differ appreciably among the various baked goods, for each of these demands particular conditions of evolution to insure highest quality products.

Typically, a leavening system is composed of one or more leavening acids and an alkaline substance capable of releasing carbon dioxide upon reaction with the leavening acid. A large number of leavening acids are known in the baking art and are widely used for this purpose at the present time. Essentially, the only gas-producing agents now in practical use are the baking carbonates, e.g., sodium bicarbonate.

While the current basic leavening processes, for example, the present commercial system of a leavening acid and bicarbonate is satisfactory, the use of the leavening acids, however, are attended by a high amount of process variables, the elimination of which is the object of much experimentation as reflected by voluminous prior art.

For example, the rate of $CO_2$ evolution in a baking preparation is primarily controlled by manipulating the reactivity of the acid component used. Further, it is very desirable that the reactivity of a leavening acid be predictable and unchanging. With leavening acids the speed of reaction has been set at the desired level by means of special techniques of manufacture. Unfortunately, the reactivity has been found to change thereafter when the acid is exposed to climatic conditions upon storage. The speed of reaction usually accelerates due to storage at high temperatures and/or high humidities. Instability is a disturbing problem with leavening acids which has also been given much attention in the prior art.

For example, U.S. Pat. No. 170,270 discloses a slow reacting leavening system, i.e., baking powder, which improved the yield of carbon dioxide produced. The baking powder comprised phytic acid mixed with sodium bicarbonate and starch.

U.S. Pat. No. 3,034,899 discloses an improvement in the stability of leavening acids by adding a finely divided calcium salt to sodium acid pyrophosphate after it has been manufactured. The required quantity of calcium salt is usually dry-mixed with the acid, and brought into intimate contact by a suitable mixing or blending apparatus. The patent discloses that when the calcium compound is mixed into the sodium acid pyrophosphate, the two compounds become intimately associated which apparently precludes the deteriorating effects of storage at atmospheric conditions.

U.S. Pat. No. 4,196,26 discloses that calcium-treated sodium aluminum phosphate exhibits improved handling characteristics and is useful as a leavening agent in moist doughs and liquid complex aluminum phosphate with a calcium compound followed by granulating the calcium-treated product while drying. Complex aluminum phosphate granules with at least a calcium rich outer surface result.

U.S. Pat. No. 4,741,917 discloses that the stability of alkali metal acid pyrophosphates employed as leavening acids an be improved and provide sufficient leavening to provide a final product of desirable characteristics without using calcium ions. The invention is achieved by blending an alkali metal and pyrophosphate with an oxide or hydroxide of magnesium. The combination of the alkali metal acid pyrophosphate leavening acid and the oxide or hydroxide of magnesium provides product stability. It also discloses there is no "calcium ion effect" and the magnesium compounds are essentially insoluble.

It is apparent that most leavening systems heretofore known and described in the prior art are concerned with and define improved chemical leavening acids employed in leavening systems. It is also apparent that there is a need to improve the chemical leavening systems currently available, and, consequently, improve the baking compositions they are employed in.

Accordingly, it is an object of this invention to provide improved baked products which employ leavening systems containing one or more leavening acids and chemical leavening bases.

It is another object of this invention to provide improved baked products using chemical leavening bases which provide better leavening gas retention and efficiency for improved uniformity in the baked product cell structure.

It is also an object of this invention to provide improved baked products by increasing bakery product volume per unit of chemical leavening agents employed.

It is a further object of this invention to provide improved baked products by imparting a more tender "mouth feel" to the leavened baked products.

These and other objects will become apparent from the following detailed description.

SUMMARY OF THE INVENTION

The present invention provides an improved leavening system which comprises one or more leavening acids and at least one novel chemical leavening base. The new chemical leavening bases comprise one or more bicarbonate salts, preferably an alkali metal bicarbonate, ammonium bicarbonate, or a mixture thereof, which has been intimately admixed with at least one food grade, essentially water insoluble salt or oxide of a metal selected from Periods 3 or 4 of the Periodic Table of the Elements and having an atomic weight of less than 66, such that the baking carbonate acts as a carrier for the insoluble salt or oxide which is essentially uniformly distributed throughout as well as on the surface of the baking bicarbonate. Surprisingly, when also uniformly distributed throughout a dough or batter, the new leavening agent provides a uniform distribution of leavening gas cells, the production of uniform cell size growth and better retention of leavening gas. The result is a more uniform cell structure, greater product volume and more tender mouth feel of the leavened bakery products.

BRIEF DESCRIPTION OF THE FIGURES

The efficacy of this invention will be better understood by reference to FIG. 1 and herein wherein the properties of certain embodiments of the leavening bases of this invention are illustrated.

FIGS. 1 and 2 represent typical curves showing the effect of various blending times on the flowability of treated baking bicarbonates.

DETAILED DESCRIPTION OF THE INVENTION

The present invention can be used in any type of baked goods which is leavened by a leavening system, that is, a leavening system which includes a gas generating base such as a baking bicarbonate and a neutralizing acid. While the improved leavening bases defined herein are primarily disclosed for use with chemical leavening acids in a leavening system, it must be understood that the invention is not limited to all-chemical systems. For example the bases defined herein can be employed to neutralize the acids produced by fermentation during the preparation of doughs. Thus, yeast-leavened dough contains a considerable amount of acid which is developed by the yeast and by bacteria during fermentation. The resulting acid produced can be neutralized by adding the pretreated baking bicarbonates of the present invention.

Baking carbonates, as employed herein include the alkali metal bicarbonates i.e., sodium and potassium bicarbonate, ammonium bicarbonate, calcium bicarbonate, magnesium bicarbonate, lithium bicarbonate, and the like. Mixtures of two or more bicarbonate salts are contemplated by the present invention.

While any bicarbonate salt known to the art can be employed in the present invention, the preferred baking carbonate is an alkali metal bicarbonate i.e., sodium bicarbonate or potassium bicarbonate, an ammonium bicarbonate, or a mixture thereof. The preferred baking bicarbonates are sodium bicarbonate and/or potassium bicarbonate.

The preferred baking bicarbonates, that is, sodium bicarbonate and/or potassium bicarbonate can be made by any process which produces a food grade bicarbonate. For example, they can be made by precipitation from solution, for example, by treating a sodium—or potassium carbonate solution with carbon dioxide to precipitate the bicarbonate, followed by drying, curing with carbon dioxide gas and screening to the desired particle size, preferably without substantial crushing or pulverizing. The bicarbonate can also be made by various dry carbonation techniques. For example by saturating a carbon dioxide-containing gas stream with water and fluidizing solid particles of the carbonate in the saturated gas stream at elevated temperatures.

The particle size of the baking bicarbonate employed therein must be of a size suitable for use for baking. The sodium bicarbonate used generally has a particle size within the range of about 25 to 250 and, preferably, from about 30 to 210 microns. The potassium bicarbonate employed generally has a particle size within the range of about 25 to 850 and, preferably, between about 30 to 450 microns. If ammonium bicarbonate is employed, the particle size will range between about 75 to 500 and, preferably, between 150 to 450 microns.

In accordance with the invention, the bicarbonate leavening base is treated with at least one food grade, essentially water insoluble salt or oxide of a metal selected from Periods 3 or 4 of the Periodic Table of the Elements and having an atomic weight of less than 66, such that the baking bicarbonate acts as a carrier for the salt or oxide.

The baking carbonate must be intimately admixed with such food grade, insoluble salt or oxide and in order to accomplish the objectives of this invention, have the salt or oxide essentially evenly and uniformly distributed throughout the baking bicarbonate and on its surface.

As used herein, the term "essentially evenly and uniformly distributed throughout the baking bicarbonate and on its surface" or the like, refers to the particle distribution of the salt or oxide on the substrate which is the mass of the bicarbonate salt. Surface micrograph analysis of the leavening bases of the invention indicates that the insoluble salt or oxide is not coating the surface of the substrate particles as a layer or film, continuous or otherwise, but rather it is evenly dispersed throughout the bicarbonate and adheres thereon as individual particles. This uniform dispersion is believed to provide an advantageous distribution of nucleating sites which provide markedly improved leavening action and the enhanced baked products of this invention.

As used herein, the term "salt" defines any food grade, essentially water insoluble salt, including organic or inorganic salts. Similarly the term "oxide" defines any food grade, essentially water insoluble oxide. The term "insoluble compound" defines both the salts and the oxides contemplated by the present invention.

The preferred metals of Periods 3 and 4 of the Periodic Table of the Elements include magnesium, aluminum, silicon, calcium, titanium, manganese, and zinc.

Typical of such compounds are the organic or inorganic salts of alkaline earth metals, such as calcium or magnesium, and the oxides of silicon, titanium, and zinc as hereinafter defined, and the like.

Non-limiting examples of the salts of the metals used herein are the salts of fatty acids, preferably saturated fatty acids, and generally those saturated fatty acids containing up to about 20 carbon atoms. Examples of such saturated fatty acids include caproic, caprylic, lauric, myristic, palmitic, stearic acid, and the like. The unsaturated fatty acids include oleic, linoleic, linolenic, and the like. Other salts include the carbonates, phosphates, silicates, and the like.

Preferred examples of insoluble calcium salts useful in the present invention are tricalcium phosphate, calcium lacate, calcium stearate, dicalcium phosphate, calcium carbonate, and calcium silicate. Preferred examples of insoluble magnesium salts useful in the present invention are magnesium stearate, magnesium carbonate, and magnesium silicate.

Preferred examples of insoluble aluminum salts useful in the present invention are aluminum acetylacetonate, aluminum oxalate, aluminum orthophosphate, aluminum salicylate, aluminum silicate, and aluminum stearate.

Preferred examples of insoluble manganese salts useful in the present invention are manganese orthophosphate and manganese pyrophosphate.

Preferred examples of insoluble zinc salts useful in the present invention are zinc oxalate, zinc orthophosphate, zinc silicate, and zinc stearate.

Oxides of alkaline earth metals are contemplated with magnesium oxide being preferred.

Oxides of silicon are contemplated with silicon dioxide, i.e., silica and silica gel, being preferred.

The oxides of titanium and zinc are also contemplated with titanium dioxide and zinc oxide being preferred.

The particle size of the essentially water insoluble compound is from about 1 to 50 and, preferably, about 5 to 25, for example, 12 microns. It is important that the particle size is not changed during mixing.

The intimate blending of the baking bicarbonate and insoluble salt or oxide is the primary operation in preparing the leavening base of this invention. Other operations, e.g., size reduction, are at best secondary and are generally undesirable. Thus, the prime function of the equipment utilized is to thoroughly mix the solid components and effect uniform and even distribution of the salt or oxide throughout and on the surface of the bicarbonate particles.

The blending apparatus and conditions utilized will depend on the specific properties of the components to be admixed. Illustrative of the properties of the components which affect the blending operation include: (1) particle size distribution, i.e., the percentage of the material in different size ranges; (2) bulk density, i.e., the weight per unit volume which will depend on aeration, vibration or packing of the material; (3) specific gravity of the material; (4) particle shape, i.e., flakes, chips, crystals, etc; (5) surface characteristics of the materials; (7) friability, i.e., the tendency of the material to break into smaller sizes, e.g. dust; (8) state of agglomeration, i.e., whether the particles exist independently or adhere to one another; (9) moisture content of the solid components; and (10) temperature limitations of the materials, i.e., as affected by the heat possibly generated by a thorough mixing.

The basic mechanism inherent in the mixing equipment is to effect small scale random motion, that is diffusion, as opposed to large-scale random motion, that is, convection and shear. Equipment which will increase the mobility of the individual particles will promote diffusive mixing. If there are no opposing segregating effects, this diffusive mixing will lead to a high degree of homogeneity. Diffusive mixing occurs when particles are distributed over a freshly developed surface and when individual particles are given increased internal mobility.

The solids-mixing devices which best accomplish the above objectives are tumblers. Tumblers with or without or with baffles may be utilized. Examples of tumblers without baffles include either horizontal or inclined drums, double cone tumblers, twin shell, cube or mushroom type tumblers. Examples of tumblers with baffles include horizontal drum tumblers and double cone tumblers revolving around their long axis. Another example is the vertical "Nauta" type mixing devices.

Because mixing apparatus such as ribbon and screw mixers, muller mixers, various mills, cause connection and shear they are not preferred for use in the present invention.

The blending is carried out in the absence of water. however non-aqueous fluids such as alcohols, e.g., ethanol or glycerol, may be employed. The blending time will depend on the apparatus utilized and can vary, for example, from 10 minutes to 2 hours, preferably, from 20 minutes to 1 hour, depending on the materials, conditions applied, etc. The blending an be carried out at room temperature or under cooling as desired. The blending can be carried out in a single (preferred) step or multiple steps. The baking carbonate or the insoluble salt each can be partially milled to reduce particle size and/or reduce agglomeration prior to their admixture with the other material, if desired.

The amount of essentially insoluble compound which is employed in the chemical leavening base is usually from about 0.10% to about 2.0% by weight and preferably from about 0.30% to about 1.0% by weight based on the total weight of the leavening base, i.e., the weight of the baking carbonate and insoluble compound combined.

The pretreated chemical leavening bases of this invention can be used with an extensive number of chemical leavening acids known to the food industry. Acid-reacting materials customarily used in baking compositions are alum, tartaric acid or its acid salts, e.g., potassium acid tartrate, the acid salts of phosphoric and pyrophosphoric acid, combinations of these materials, and the like. Specific examples include monocalcium phosphate (MCP), certain acid aluminum salts such as sodium aluminum sulfate (SAS), sodium aluminum phosphate (SAP or SALP), and the like. Sodium acid pyrophosphate (SAPP) has been found to be well suited as a chemical leavening acid.

Many modifications of the leavening acids have been effected for improving their properties, such as reactivities, stability, flow characteristics, etc. All of these improvements are contemplated when one or more of the leavening acids are employed in the chemical leavening systems of this invention.

The compounding and mixing of the acid and baking bicarbonate are also critical steps in the preparation of the leavening systems of this invention. The amounts of the individual leavening acids and the pretreated leavening bases must be carefully measured and mixing must be uniform and thorough to insure a leavening system of uniform available carbon dioxide content.

The present invention is applicable to a large variety of baking compositions including, for example, doughs and batters for cakes, quick breads, muffins, biscuits, pancakes, waffles, and the like, which require the generation of carbon dioxide gas in order to "rise" when they are baked. Such compositions are intended herein to be encompassed by the term "baking compositions."

Since the compositions of the present invention are generally intended for use in baking, all materials used in the preparation of these compositions should be food grade and should not strongly affect pH, taste or smell of the baked goods.

While the following explanation is theoretical in nature and its presentation should not restrict the scope of the present invention, it is believed that the baking bicarbonate which has been treated in accordance with the invention provides many more nucleation sites for the generation of carbon dioxide than the known leavening systems. The baking carbonate acting as a carrier for the insoluble component provides more active sites in number which can be more uniformly dispersed throughout the baking components in which they are admixed. The well dispersed treated carbonate acts as a nucleating agent and, when activated, produces a finer and more uniform cell size range. Since the boundaries about the cells are more uniform, so is the texture of the resulting baked products. The leavening system heretofore used, generally resulted in a coarser, less uniform, cell structure.

The present invention will be more fully illustrated in the Examples which follow. All percentages, parts, and proportions are by weight and all temperatures are in degrees F., unless otherwise indicated.

EXAMPLE I

In this Example white cakes were prepared using a leavening base of the present invention or an untreated leavening base for comparison.

The treated leavening base was prepared by intimately mixing 99.5% by weight of potassium bicarbonate with 0.5% by weight of silicon dioxide ($SiO_2$). The potassium bicarbonate had an average particle size of about 00 microns within the range of about 75 to 350 microns and the $SiO_2$ had an average particle size of about 12 microns within the range of about 5 to 20 microns.

The blending was done in a horizontal tumbler with baffles for a period of about 5 minutes. The temperature was ambient.

The leavening bases were used with the following cake formula wherein all percentages were by weight.

| Ingredient | % |
|---|---|
| Cake flour | 22.56 |
| Sugar | 29.33 |
| Egg white solids | 2.26 |
| NFDM (non-fat dry milk) | 2.26 |
| Salt | 0.68 |
| Sodium acid pyrophosphate (SAPP 28) | 0.64 |
| Potassium bicarbonate leavening* | 0.60 |
| Vanilla flavor | 0.28 |
| Water | 34.40 |
| Emulsifier | 0.23 |
| Shortening | 6.77 |
| Total | 100.00 |

*treated and untreated

The dry ingredients, including the treated and untreated potassium bicarbonate, were mixed under standard conditions using a Hobart mixer and paddle. The liquid ingredients and shortening were added and incorporated into the batter. Scaled 400 gram portions of batter were separated and poured into greased eight inch round pans. They were baked for about 20 minutes in an oven controlled at 300° F.

The resulting cakes were evaluated using AACC (American Association of Cereal Chemists) Method 10-90 (modified). A comparison of the evaluations is presented in Table I.

TABLE I

| $SiO_2$ (by weight) | | 0.0% | 0.5% |
|---|---|---|---|
| INTERNAL FACTORS (points) | | — | — |
| CELLS | | | |
| UNIFORMITY | (10) | 9.0 | 10.0 |
| SIZE | (10) | 9.5 | 10.0 |
| THICKNESS OF WALLS | (10) | 10.0 | 10.0 |

TABLE I-continued

| $SiO_2$ (by weight) | | 0.0% | 0.5% |
|---|---|---|---|
| GRAIN TEXTURE | (16) | 15.0 | 16.0 |
| MOISTNESS | (10) | 8.0 | 10.0 |
| TENDERNESS | (14) | 13.0 | 14.0 |
| SOFTNESS | (10) | 9.0 | 10.0 |
| TOTAL | | 73.5 | 80.0 |

The above results indicate an overall improvement of almost 9 percent in the quality of the baked product using the treated leavening base.

The resulting cakes were also evaluated using AACC Method 10-91 template measurements for volume. The evaluations were as follows:

(a) Untreated potassium bicarbonate (0% $SiO_2$)=99 mm (b) Treated potassium bicarbonate (0.5% $SiO_2$)=106 mm.

A comparison of the above results indicates an improvement of over 7 percent in the volume of the baked product when using the leavening base of the present invention.

EXAMPLE II

In this Example white cakes were again prepared using a leavening base of the present invention or an untreated chemical leavening base for comparison.

The leavening base was prepared by intimately mixing 99.5% by weight of sodium bicarbonate with 0.5% by weight of silicon dioxide ($SiO_2$). The sodium bicarbonate had an average particle size of about 95 microns within the range of about 45 to 150 microns and the SiO had an average particle size of about 12 microns within the range of about 5 to 20 microns.

The blending was done in a horizontal tumbler with baffles for a period of about 25 minutes. The temperature was ambient.

The treated and untreated leavening bases were used with the following cake formula wherein all percentages were by weight.

| Ingredient | % |
|---|---|
| Cake flour | 22.58 |
| Sugar | 29.35 |
| Egg white solids | 2.26 |
| NFDM (non-fat dry milk) | 2.26 |
| Salt | 0.68 |
| Sodium acid pyrophosphate (SAPP 28) | 0.64 |
| Sodium bicarbonate leavening* | 0.51 |
| Vanilla flavor | 0.28 |
| Water | 34.44 |
| Emulsifier | 0.23 |
| Shortening | 6.77 |
| Total | 100.00 |

*treated and untreated

The dry ingredients, including the treated and untreated sodium bicarbonate, were mixed under standard conditions using a Hobart mixer with paddle. The liquid ingredients and shortening were added and incorporated into the batter. Scaled 400 gram portions of batter were separated and poured into greased eight inch round pans. They were baked for about 20 minutes in an oven controlled at 300° F.

The resulting cakes were again evaluated using AACC Method 10-90 (modified). A comparison of the evaluations are presented in Table II.

TABLE II

| SiO$_2$ (by weight)<br>INTERNAL FACTORS | (points) | 0.0% | 0.5% |
|---|---|---|---|
| CELLS | | | |
| UNIFORMITY | (10) | 8.5 | 10.0 |
| SIZE | (10) | 8.0 | 10.0 |
| THICKNESS OF WALLS | (10) | 8.5 | 10.0 |
| GRAIN | (16) | 15.0 | 16.0 |
| TEXTURE | | | |
| MOISTNESS | (10) | 8.0 | 10.0 |
| TENDERNESS | (14) | 13.0 | 13.5 |
| SOFTNESS | (10) | 8.0 | 10.0 |
| TOTAL | | 68.0 | 79.5 |

The results shown in Table II indicate an improvement of almost 17 percent in the overall quality of the baked product using the treated sodium bicarbonate leavening base.

The cakes were also evaluated using AACC Method 10-91 template measurements for volume. The evaluations were as follows:

(a) Untreated sodium bicarbonate (0% SiO$_2$) = 94 mm
(b) Treated sodium bicarbonate (0.5% SiO$_2$) = 103 mm.

A comparison of the above results indicates about a 9.5 percent improvement in the volume of the baked product when a leavening base of the present invention was employed.

EXAMPLE III

In this Example white cakes were prepared using a silicon dioxide treated potassium bicarbonate leavening base. Portions of the leavening base were blended for different time periods for comparison purposes.

The leavening base was prepared by intimately mixing 99.5% by weight of potassium bicarbonate with 0.5% by weight of silicon dioxide. The potassium bicarbonate had an average particle size of about 200 microns within the range of about 75 to 350 microns and the silicon dioxide had an average particle size of about 12 microns within the range of about 5 to 20 microns.

The blending was done in a horizontal tumbler with baffles for periods of from 5 to 30 minutes and at intervals of 5 minutes each. The temperature was ambient.

The resulting treated leavening bases were used with the following cake formula wherein all percentages were by weight.

| Ingredient | % |
|---|---|
| Cake flour | 22.56 |
| Sugar | 29.33 |
| Egg white solids | 2.26 |
| NFDM (non-fat dry milk) | 2.26 |
| Salt | 0.68 |
| Sodium acid pyrophosphate (SAPP 28) | 0.64 |
| Treated potassium bicarbonate (both) | 0.60 |
| Vanilla flavor | 0.28 |
| Water | 34.40 |
| Emulsifier | 0.23 |
| Shortening | 6.77 |
| Total | 100.00 |

The dry ingredients, including each portion of the treated potassium bicarbonate, were mixed under standard conditions using a Hobart mixer with paddle. The liquid ingredients and shortening were added and incorporated into the batter. Scaled 400 gram portions of batter were separated and poured into greased eight inch round pans. They were baked for about 20 minutes in an oven controlled at 300° F.

The resulting cakes were evaluated using AACC Method 10-90 (modified). A comparison of the evaluations is presented in Table III.

TABLE III

| | | BLEND TIME VARIABLES USING SiO$_2$ (0.5%) | | | | | |
|---|---|---|---|---|---|---|---|
| Internal | | Minutes | | | | | |
| Factors | (points) | 5 | 10 | 15 | 20 | 25 | 30 |
| Cells | | | | | | | |
| Uniformity | (10) | 8.0 | 9.0 | 10.0 | 10.0 | 10.0 | 10.0 |
| Size | (10) | 8.0 | 9.0 | 10.0 | 10.0 | 10.0 | 10.0 |
| Thickness of Walls | (10) | 8.0 | 10.0 | 10.0 | 10.0 | 10.0 | 10.0 |
| Grain | (16) | 12.0 | 14.0 | 15.0 | 15.0 | 15.0 | 16.0 |
| Texture | | | | | | | |
| Moistness | (10) | 8.0 | 8.0 | 10.0 | 9.0 | 10.0 | 10.0 |
| Tenderness | (14) | 1.0 | 12.0 | 14.0 | 13.0 | 14.0 | 14.0 |
| Softness | (10) | 10.0 | 9.0 | 10.0 | 10.0 | 10.0 | 10.0 |
| TOTAL | | 66.0 | 71.0 | 79.0 | 77.0 | 79.0 | 80.0 |

The results of Table III illustrate that the intimate mixing or blending of the insoluble salt or oxide is important as well as the use of the salt or oxide per se. Table III shows that an improvement of almost 20 percent resulted when the blending period was increased to 25 minutes from an initial period of 5 minutes and over 21 percent when the blending period was increased to 30 minutes.

The cakes were also evaluated using AACC Method 10-91 template measurements for volume. The evaluations were as follows:

| Blend Time (minutes) - | 5 | 10 | 15 | 20 | 25 | 30 |
|---|---|---|---|---|---|---|
| Volume Data (mm) - | 87 | 90 | 96 | 92 | 91 | 90 |

The above data indicate a marked improvement in the volume of the baked products when the mixing period is greater than 5 minutes.

EXAMPLE IV

In this Example biscuits are prepared using magnesium oxide (MgO) to treat a leavening base according to the present invention.

The leavening base is prepared by intimately mixing 99.7% by weight of sodium bicarbonate with 0.3% by weight of magnesium oxide. The sodium bicarbonate has an average particle size of about 95 microns within the range of about 45 to 150 microns and the magnesium oxide has an average particle size of about 12 microns within the range of about 5 to 20 microns.

The blending is done in a horizontal tumbler with baffles for a period of 35 minutes. The temperature is ambient. There is essentially no reduction in the respective particles sizes of the starting materials and the materials are uniformly blended.

The resulting treated leavening base is used with the following biscuit formula wherein all percentages are by weight.

| Ingredient | % |
|---|---|
| Pastry flour | 49.69 |
| NFDM (non-fat dry milk) | 4.97 |
| Sugar | 2.98 |
| Salt | 0.99 |
| Sodium aluminum phosphate (SALP) | 0.37 |
| Sodium acid pyrophosphate (SAPP) | 0.52 |

| Ingredient | % |
| --- | --- |
| Treated sodium bicarbonate | 0.73 |
| Shortening | 12.92 |
| Water | 26.83 |
| Total | 100.00 |

All the dry ingredients including the pretreated sodium bicarbonate are blended in a Hobart mixer with paddle for several minutes. The shortening is blended in next and finally water is added to form a dough.

A sheet of biscuit dough 5 mm thick is prepared and cut into two inch round unbaked biscuits. They are baked at 350° F. for eight minutes in a standard convection oven.

The resulting biscuits are evaluated using scoring system similar to AACC Method 10-90. The evaluation of internal factors indicates cells, grain and texture comparable to those resulting from the previous Examples.

EXAMPLE V

In this Example biscuits are prepared using a leavening base according to the present invention comprising stoichiometrically balanced parts of sodium and potassium bicarbonate (based on evolution of $CO_2$).

The leavening base is prepared by intimately blending 99.5% by weight of a 50:50 mixture of sodium bicarbonate and potassium bicarbonate with 0.5% by weight of silicon dioxide ($SiO_2$). The sodium bicarbonate has an average particle size of about 95 microns within the range of about 45 to 150 microns; the potassium bicarbonate has an average particle size of about 200 microns within the range of about 75 to 350 microns; and the silicon dioxide has an average particle size of about 1 micron within the range of about 5 to 20 microns.

The blending is done in a horizontal tumbler with baffler for a period of 30 minutes. The temperature is ambient. There is essentially no reduction in the respective particle sizes of the starting materials, and the materials are uniformly blended.

The resulting treated leavening base is used with the following biscuit formula wherein all percentages are by weight.

| Ingredient | % |
| --- | --- |
| Pastry flour | 49.62 |
| NFDM (non-fat dry milk) | 4.97 |
| Sugar | 2.98 |
| Salt | 0.99 |
| Sodium aluminum phosphate (SALP) | 0.37 |
| Sodium acid pyrophosphate (SAPP) | 0.52 |
| Shortening | 12.92 |
| Water | 26.83 |
| Treated sodium/potassium bicarbonate* | 0.80 |
| Total | 100.00 |

*50:50 mixture

All the dry ingredients including the mixture of treated sodium and potassium bicarbonate are blended in a Hobart mixer with paddle for several minutes. Shortening is blended in next, and then water is added to form a dough.

A sheet of biscuit dough 5 mm. thick is prepared and cut into two inch round unbaked biscuits. They are baked at 350° F. for eight minutes in a standard convection oven.

The resulting biscuits are evaluated using a scoring system similar to AACC Method 10-90. The evaluation of internal factors indicates cells, grain and texture comparable to those resulting from the previous Examples.

EXAMPLE VI

In this Example white cakes are prepared using a leavening base of the present invention treated with magnesium carbonate.

The treated leavening base is prepared by intimately mixing 99.5% by weight of potassium bicarbonate with 0.5% by weight of magnesium carbonate. The potassium bicarbonate has an average particle size of about 200 microns within the range of about 75 to 350 microns, and the magnesium carbonate has an average particle size of about 10 microns within the range of about 5 to 20 microns.

The blending is done in a horizontal tumbler with baffles for a period of about 35 minutes. The temperature is ambient.

The leavening base is used with the following cake formula wherein all percentages are by weight.

| Ingredient | % |
| --- | --- |
| Cake flour | 22.56 |
| Sugar | 29.33 |
| Egg white solids | 2.26 |
| NFDM (non-fat dry milk) | 2.26 |
| Salt | 0.68 |
| Sodium acid pyrophosphate (SAPP 28) | 0.64 |
| Treated potassium bicarbonate | 0.60 |
| Vanilla flavor | 0.28 |
| Water | 34.40 |
| Emulsifier | 0.23 |
| Shortening | 6.77 |
| Total | 100.00 |

The dry ingredients including the treated potassium bicarbonate are mixed under standard conditions using a Hobart mixer with paddle. The liquid ingredients and shortening are added and incorporated into the batter. Scaled 400 gram portions of batter are separated and poured into greased eight inch round pans. They are baked for about 20 minutes in an oven controlled at 300° F.

The resulting cakes are evaluated using AACC (American Association of Cereal Chemists) Methods 10-90 (modified) and 10-91. An evaluation of internal factors indicates that cells, grain and texture are comparable to those resulting from the previous Examples. An evaluation of volume data also indicates comparable results.

EXAMPLE VII

This Example is presented to illustrate the fact that the treatment of leavening acids with an insoluble salt or oxide fails to product the efficacious results as does the treatment of leavening bases. It further illustrates the fact that longer and hence thorough mixing or blending times also have no beneficial result on leavening acids as it does on leavening bases.

In this Example, white cakes wre prepared using both an untreated and a silicon dioxide treated sodium acid pyrophosphate (SAPP28) leavening acid. Portions of the treated leavening acid were blended for different time periods for comparison purposes.

The treated leavening acid was prepared by intimately mixing 99.5% by weight of SAPP 28 with 0.5% by weight of silicon dioxide. The SAPP 28 had an average particle size of less than 74 microns and the silicon dioxide had an average particle size of about 12 microns within the range of about 5 to 20 microns.

The blending was done in a horizontal tumbler with baffles for periods of from 5 to 30 minutes and at intervals of 5 minutes each. The temperature was ambient.

The resulting treated leavening acids and an untreated acid were used with the following cake formula wheein all percentages were by weight.

| Ingredient | % |
|---|---|
| Cake flour | 22.58 |
| Sugar | 29.35 |
| Egg white solids | 2.26 |
| NFDM (non-fat dry milk) | 2.26 |
| Salt | 0.68 |
| Sodium acid pyrophosphate (SAPP 28)* | 0.64 |
| Sodium bicarbonate | 0.51 |
| Vanilla flavor | 0.28 |
| Water | 34.44 |
| Emulsifier | 0.23 |
| Shortening | 6.77 |
| Total | 100.00 |

*Treated and Untreated

The dry ingredients, including each portion of the treated and untreated SAPP 28, wee mixed under standard conditions using a Hobart mixer with paddle. The liquid ingredients and shortening were added and incorporated into the batter. Scaled 400 gram portions of batter were separated and poured into greased eight inch round pans. They wee baked for about 20 minutes in an oven controlled at 300° F.

The resulting cakes were evaluated using AACC Method 10-90 (modified). A comparison of the evaluations is presented in Table IV.

TABLE IV

| BLEND TIME VARIABLES USING $SiO_2$ (0.5%) | | | | | | | | |
|---|---|---|---|---|---|---|---|---|
| | | Minutes | | | | | | |
| INTERNAL FACTORS | (points) | 5 | 10 | 15 | 20 | 25 | 30 | Untreated |
| CELLS | | | | | | | | |
| UNIFORMITY | (10) | 9.0 | 9.0 | 10.0 | 7.0 | 10.0 | 9.0 | 10.00 |
| SIZE | (10) | 8.0 | 7.0 | 9.0 | 7.0 | 9.0 | 8.0 | 9.0 |
| THICKNESS OF WALLS | (10) | 9.0 | 8.0 | 9.0 | 8.0 | 9.0 | 9.0 | 9.0 |
| GRAIN | (16) | 14.0 | 14.0 | 14.0 | 12.0 | 16.0 | 14.0 | 16.0 |
| TEXTURE | | | | | | | | |
| MOISTNESS | (10) | 7.0 | 9.0 | 7.0 | 8.0 | 9.0 | 8.0 | 8.0 |
| TENDERNESS | (14) | 1.0 | 12.0 | 12.0 | 11.0 | 13.0 | 12.0 | 12.0 |
| SOFTNESS | (10) | 9.0 | 10.0 | 9.0 | 9.0 | 8.0 | 8.0 | 10.0 |
| TOTAL | | 68.0 | 69.0 | 70.0 | 62.0 | 74.0 | 68.0 | 74.0 |

The results of Table IV clearly illustrate that the treatment of leavening acids (as opposed to bases) with an insoluble salt or oxide has no apparent beneficial effect on the acid. In fact the data evidence that an untreated acid produces a superior baked product than those prepared from treated acids in most instances.

The cakes were also evaluated using AACC Method 10-91 template measurements for volume. The evaluations were as follows:

| Blend Time (minutes) | 5 | 10 | 15 | 20 | 25 | 30 | Untreated |
|---|---|---|---|---|---|---|---|
| Volume Data (mm) | 83 | 80 | 82 | 82 | 80 | 83 | 82 |

The above data also indicate that essentially no improvement results in the volume of the baked products from the use of treated leavening acids even when the mixing period is varied over a relatively long period of time.

EXAMPLE VIII

This Example is presented to again illustrate that the degree of blending of the insoluble salt or oxide with the leavening base is critical to its efficacy as a leavening agent. This Example, in addition, differentiates the use of the salt or oxide as a flow aid from its use of a nucleating site on the baking bicarbonate in order to improve the properties of baked products.

As previously discussed herein, salts and oxides have been used to improve the handling and stability of the acids used in leavening systems. Some of the materials used function as flow aids and hence are used to treat the acids when they are subjected to storage at high temperatures and/or high humidities.

In an effort to determine if this function, e.g., as a flow aid, was the reason for the efficacy of the invention, a series of experimental runs was made which related blending times to flowability. These results could then be compared to those which evidenced the criticality of blending time periods with relation to the advantages of the invention.

It is known that the Angle of Repose and the Angle of Fall manifested by powders are valuable in evaluating the flow characteristics of powders. In this Example, the methodology of two flow tests were employed, viz., a manual method and the Hosokawa method.

In the manual method, the Angle of Repose is determined by pouring the test powder through a funnel so that a one inch mound of powder is formed as determined by the height of the funnel above the test surface. The diameter of the mound is drawn or marked and then measured in a plurality of places after discarding the powder. The Angle of Repose is then calculated using an average of three measurements.

The Hosokawa method is a somewhat more sophisticated method employing a powder tester produced and marketed by Hosokawa Micron Division of Summit, N.J. The powder tester builds a cone-shaped mound of powder fashioned by controlling the vibration amplitude applied to a container holding the powder and funnel means attached thereto. The Angle of Repose is measured directly by a protractor.

The Angle of Fall in the Hosokawa method is obtained by "shocking" the mound of powder by dropping a weight in a controlled path near to said mound so as to compact the powder.

When the Angle of Fall is small, the material has a free flowing characteristic.

In this Example, an average of two separate series of runs is reported for each method. Seven different blend times having five minute intervals were run and recorded.

In referring to FIGS. 1 and 2 it can be seen that the improvement in flowability was maximized within a 5 minute interval. Both methods and both the Angles of Repose and Fall indicate that no noteworthy improvement results after 5 minutes of blending. This 5 minute blending time period, as illustrated in the previous Examples, is usually an insufficient period to attain the degree of intimate blending required by the invention to thoroughly disperse the insoluble salt or oxide to the required and thus desired degree.

Thus, even though the flow of the treated bicarbonate improved within 5 minutes of blending, it still would most likely not perform in accordance with the invention.

In this regard, it must be noted that while the time period of blending is most important, it must be stressed that t is the resulting degree of blending and admixture which is critical. It is submitted that highly efficient blenders and techniques could be provided which could accomplish the desired result in less than 10 minutes.

Many modifications and variations of this invention may be made without departing from its spirit and scope, as will become apparent to those skilled in the art. The specific embodiments described herein are offered by way of example only, and the invention is limited only by the terms of the appended claims.

What is claimed is:

1. An improved chemical leavening base for use in leavened compositions which comprises a baking bicarbonate intimately admixed with at least one food grade, essentially water insoluble salt or oxide of a metal selected from Periods 3 or 4 of the Periodic Table of the Elements and having an atomic weight of less than 66 such that the carbonate acts as a carrier for the insoluble salt or oxide which is essentially uniformly distributed throughout and on the surface of the bicarbonate.

2. The composition of claim 1 wherein the leavening base contains from about 0.10% to about 2.0% by weight of the insoluble salt or oxide.

3. The composition of claim 1 wherein the baking bicarbonate is an alkali metal bicarbonate, ammonium bicarbonate or a mixture thereof.

4. The composition of claim 1 wherein the insoluble salt or oxide has a particle size within the range of from about 1 to 50 microns.

5. The composition of claim 1 wherein the metal is a member selected from the group consisting of magnesium, aluminum, silicon, calcium, titanium, manganese, and zinc.

6. The composition of claim 1 wherein the insoluble salt is a salt of a fatty acid, carbonate, phosphate or silicate.

7. The composition of claim 1 wherein the insoluble oxide is zinc oxide, titanium dioxide, magnesium oxide, silica, or silica gel.

8. An improved chemical leavening system for use in leavened baking compositions which comprises at least one chemical leavening acid and at least one chemical leavening base which comprises a baking bicarbonate intimately admixed with at least one food grade, essentially water insoluble salt or oxide of a metal selected from Periods 3 or 4 of the Periodic Table of Elements and having an atomic weight of less than 66 such that the carbonate acts as a carrier for the insoluble salt or oxide which is essentially uniformly distributed throughout and on the surface of the bicarbonate.

9. The composition of claim 8 wherein the leavening base contains from about 0.10% to about 2.0% by weight of the insoluble salt or oxide.

10. The composition of claim 8 wherein the baking bicarbonate is an alkali metal bicarbonate, ammonium bicarbonate or a mixture thereof.

11. The composition of claim 8 wherein the insoluble salt or oxide has a particle size within the range of from about 1 to 50 microns.

12. The composition of claim 8 wherein the metal is a member selected from the group consisting of magnesium, aluminum, silicon, calcium, titanium, manganese, and zinc.

13. The composition of claim 8 wherein the insoluble salt is a salt of a fatty acid, carbonate, phosphate or silicate.

14. The composition of claim 8 wherein the insoluble oxide is zinc oxide, titanium dioxide, magnesium oxide, silica, or silica gel.

15. A method of preparing an improved baking composition rich comprises intimately admixing a chemical leavening base comprising a baking bicarbonate with at least one food grade, essentially water insoluble salt or oxide of a metal selected from Periods 3 or 4 of the Periodic Table of the Elements and having an atomic weight of less than 66 such that the carbonate acts as a carrier for the insoluble salt or oxide which is essentially uniformly distributed throughout and on the surface of the bicarbonate and adding the resulting treated chemical leavening base to the components of the baking composition.

16. The method of claim 15 wherein the leavening base contains from about 0.10% to about 2.0% by weight of the insoluble salt or oxide.

17. The method of claim 15 wherein the baking bicarbonate is an alkali metal bicarbonate, ammonium bicarbonate or a mixture thereof.

18. The method of claim 15 wherein the insoluble salt or oxide has a particle size within the range of from about 1 to 50 microns.

19. The composition of claim 15 wherein the metal is a member selected from the group consisting of magnesium, aluminum, silicon, calcium, titanium, manganese, and zinc.

20. The method of claim 15 wherein the insoluble salt is a salt of a fatty acid, carbonate, phosphate or silicate.

21. The method of claim 15 wherein the insoluble oxide is zinc oxide, titanium dioxide, magnesium oxide, silica, or silica gel.

22. The method of claim 15 wherein the admixing is carried out for a period of from 10 minutes to 2 hours.

23. The method of claim 15 wherein the admixing is a dry operation.

24. The method of claim 15 wherein the admixing is carried out in the presence of a non-aqueous fluid.

25. The method of claim 24 wherein the non-aqueous fluid is an alcohol.

* * * * *